UNITED STATES PATENT OFFICE.

GEORGE C. NIXON, OF DETROIT, MICHIGAN.

CEMENTING.

1,333,768.  Specification of Letters Patent.  Patented Mar. 16, 1920.

No Drawing.  Application filed June 14, 1917. Serial No. 174,689.

*To all whom it may concern:*

Be it known that I, GEORGE C. NIXON, a citizen of the United States, residing at Detroit, county of Wayne, State of Michigan, have invented a certain new and useful Improvement in Cementing, and declare the following to be a full, clear, and exact description of the same, such as will enable others skilled in the art to which it pertains to make and use the same, reference being had to the accompanying drawings, which form a part of this specification.

My invention relates to case-hardening and an object of my improvements is to provide a cheap and specially effective material for imparting carbon to articles of steel.

I secure this object in the process and by the means hereinafter described.

I take saw dust and sort it in a conventional way into grains of different sizes, or of a required size. I mix an energizing material with the saw dust having grains of uniform size and then subject the mixture to a temperature sufficient to char the saw dust but below the melting or transforming temperature of the energizing substance. This produces a charcoal of uniform sized grain having the energizing material intimately mixed therewith.

The article to be case-hardened is inclosed by the product of the above described operations and subjected to heat in the usual way, thus imparting the carbon necessary so that it may be hardened by sudden cooling.

If the saw dust is of an absorbent nature, I prefer to dissolve a soluble energizing material in water and then soak the saw dust in the solution thus formed.

With a pine saw dust the resinous content will cause the powdered energizing material to adhere to the grains of the saw dust and after the saw dust is charred, as above described, the product will have the granular carbon intimately mixed with the energizing material.

In any case an energizing material may be used in the form of powder and mixed with the saw dust, which being charred, as above described, produces a product embodying my invention.

Sodium carbonate may be dissolved in water and used as above described or other energizing materials which are insoluble in water such as barium, or calcium carbonate may be powdered and mixed with the saw dust which will produce the cementing material which is the object of my invention.

The material produced by the above described process is very effective and cheap.

In this art the article to be acted on is generally surrounded by and sustained by the carbonizing material and when heat is applied the material shrinks and the article no longer being properly sustained thereby is displaced and the process therefore fails in completeness or effectiveness. The material produced by the above described process completely sustains the article in position and avoids the recognized disadvantage due to the displacing of the article as above described.

What I claim is:

1. The method of producing cementing or case-hardening material which consists in mixing a material capable of being charred with an energizing material and subjecting the mixture to a temperature sufficient to char the first named material but below the melting point of the energizing material.

2. The method of producing cementing or case-hardening a material which consists in dissolving an energizing substance in water, mixing saw dust with the solution thus formed and charring the saw dust.

3. The method of producing cementing or case hardening material which consists in mixing a granular substance adapted to be charred with an energizing material and subjecting the mixture to a temperature sufficient to char the first named material but below the melting point of the energizing material.

In testimony whereof, I sign this specification.

GEORGE C. NIXON.